US008954956B2

(12) United States Patent
Hemphill et al.

(10) Patent No.: US 8,954,956 B2
(45) Date of Patent: Feb. 10, 2015

(54) DISTRIBUTING AND EXECUTING SOFTWARE CODE

(71) Applicant: WigWag, LLC, Austin, TX (US)

(72) Inventors: Thomas E. Hemphill, Austin, TX (US); Jean-Marc Trinon, Liege (BE)

(73) Assignee: Wigwag, LLC, Austin, TX (US)

( * ) Notice: Subject to any disclaimer, the term of this patent is extended or adjusted under 35 U.S.C. 154(b) by 200 days.

(21) Appl. No.: 13/741,421

(22) Filed: Jan. 15, 2013

(65) Prior Publication Data

US 2014/0201731 A1    Jul. 17, 2014

(51) Int. Cl.
| | |
|---|---|
| H04L 12/28 | (2006.01) |
| H04M 1/00 | (2006.01) |
| G05B 11/01 | (2006.01) |
| G06Q 30/00 | (2012.01) |
| G06F 15/173 | (2006.01) |
| G06F 15/16 | (2006.01) |
| G06F 9/44 | (2006.01) |

(52) U.S. Cl.
USPC ............ 717/178; 370/392; 455/557; 700/11; 700/94; 705/26.1; 709/204; 709/208; 709/219; 709/220; 709/222; 709/223; 709/224; 719/330

(58) Field of Classification Search
None
See application file for complete search history.

(56) References Cited

U.S. PATENT DOCUMENTS

| | | | |
|---|---|---|---|
| 6,496,862 B1 * | 12/2002 | Akatsu et al. ................. | 709/224 |
| 6,567,861 B1 * | 5/2003 | Kasichainula et al. ....... | 719/330 |
| 6,941,561 B1 * | 9/2005 | Kasichainula et al. ....... | 719/330 |
| 7,813,822 B1 * | 10/2010 | Hoffberg ......................... | 700/94 |
| 7,933,965 B2 * | 4/2011 | Bonar et al. .................. | 709/208 |
| 8,122,107 B2 * | 2/2012 | Bonar et al. .................. | 709/220 |
| 8,140,658 B1 * | 3/2012 | Gelvin et al. ................. | 709/224 |
| 8,155,120 B2 * | 4/2012 | McCoy et al. ................ | 370/392 |
| 8,667,091 B2 * | 3/2014 | Almadi et al. ................ | 709/219 |
| 2001/0056544 A1 * | 12/2001 | Walker .......................... | 713/200 |
| 2007/0168486 A1 * | 7/2007 | McCoy et al. ................ | 709/223 |
| 2008/0091309 A1 * | 4/2008 | Walker .......................... | 701/209 |
| 2008/0108388 A1 * | 5/2008 | Ebrom et al. ................. | 455/557 |
| 2008/0140862 A1 * | 6/2008 | Elston et al. .................. | 709/248 |
| 2009/0287803 A1 * | 11/2009 | McQuillan et al. ........... | 709/222 |
| 2010/0153771 A1 * | 6/2010 | Gordon et al. ................ | 709/204 |
| 2012/0150677 A1 * | 6/2012 | Shuster ........................ | 705/26.1 |
| 2013/0310951 A1 * | 11/2013 | Fisher ............................ | 700/11 |

* cited by examiner

*Primary Examiner* — Don Wong
*Assistant Examiner* — Anibal Rivera
(74) *Attorney, Agent, or Firm* — Fogarty, L.L.C.; Luiz von Paumgartten

(57) ABSTRACT

Systems and methods for distributing and executing software code. In some embodiments, a method may include storing program instructions configured to invoke interactions with one or more of a plurality of automation devices, the plurality of automation devices divided into sets of one or more automation devices, each set of one or more automation devices associated with a respective Distributed Execution System (DES) node. The method may also include distributing the program instructions to each DES node, each DES node configured to operate in a discovery mode to evaluate the program instructions and identify one or more semantic statements that are applicable to its associated set of one or more automation devices, each DES node configured to operate in an execution mode subsequently to the discovery mode to execute the identified one or more semantic statements with respect to that DES node's associated set of one or more automation devices.

20 Claims, 8 Drawing Sheets

DISTRIBUTING AND EXECUTING SOFTWARE CODE

FIELD

This disclosure relates generally to the field of electronics, and more specifically, to systems and methods for distributing and executing software code.

BACKGROUND

The following discussion sets forth the inventors' own knowledge of certain technologies and/or problems associated therewith. Accordingly, this discussion is not an admission of prior art, and it is not an admission of the knowledge available to a person of ordinary skill in the art.

Automation and control systems make use of computers and/or microcontroller-based devices to "automate" the operation of other devices, machines, or appliances. For example, in home or building applications, an automation and control system may be configured to apply varying degrees of intelligence and automation to lighting, doors, window treatments, audio and video equipment, security systems, HVAC components, or the like. In industrial applications, automation and control systems may be configured to manage robotics systems, motors, machine vision equipment, assembly lines, or the like. Other applications include, for example, environmental monitoring, agriculture, law enforcement, military surveillance, etc. Generally speaking, automation and control systems may be employed in virtually any environment.

Typical elements of an automation and control system include sensors and controllers. In some cases, a single device may include both a sensor (e.g., a photodiode) and a controller (e.g., a circuit configured to control a switch to which a controlled device—a light bulb—is connected). In other cases, sensors and controllers may be distinct devices. It should be noted that, in various implementations, a given automation and control system might include tens or hundreds of disparate sensors and controllers, depending upon the system's complexity.

Most automation and control software programs are written, compiled, and executed on a single computer, sometimes referred to as the "head of control." The inventors hereof have determined, however, that such a technique is only appropriate when the devices controlled by the head of control are within its reach. In those cases, the head of control may be capable of determining, in a reasonable amount of time, all the information needed in order to make its automation decisions. Often, such information is obtained from one or more devices via a network connection. The head of control may then be able to control a corresponding device(s), also in a reasonable amount of time, via the network connection.

In highly distributed environments or environments where there are many devices and/or long distances involved, however, the foregoing techniques do not work. For example, there are situations where the head of control must communicate with multiple devices, one at a time, and make a decision each time a different device replies. In these situations, varying degrees of latency in communications between the head of control and the remote device often lead to scalability problems.

Moreover, control and automation systems can have very dynamic properties. At any given time, the number of devices in a system may increase or decrease, the physical or geographical location of one or more devices may change, network connections may go down and later be re-established, certain communication channels may have better characteristics than others, etc. Generally speaking, every time a modification is made to a device or connection in the system, the program executed by the head of control needs to be modified in order to accommodate that change.

SUMMARY

Embodiments of systems and methods for distributing and executing software code are described herein. In an illustrative, non-limiting embodiment, a method may include electronically storing program instructions configured to invoke interactions with one or more of a plurality of automation devices, the plurality of automation devices divided into sets of one or more automation devices, each set of one or more automation devices associated with a respective Distributed Execution System (DES) node; and electronically distributing the program instructions to each DES node, each DES node configured to operate in a discovery mode to evaluate the program instructions and identify one or more semantic statements that are applicable to its associated set of one or more automation devices, each DES node configured to operate in an execution mode subsequently to the discovery mode to execute the identified one or more semantic statements with respect to that DES node's associated set of one or more automation devices.

In some implementations, the program instructions may include a semantic statement applicable to a selected one of a plurality of different categories of automation devices, a given DES node may be configured to identify a subset of one or more automation devices among its associated set of one or more automation devices that fit the selected category, and the given DES may be configured to execute the semantic statement with respect to the subset of one or more automation devices. Additionally or alternatively, the program instructions may include a semantic statement applicable to a selected one of a plurality of different locations, a first DES node may be configured to execute the semantic statement in response to the first DES node's location matching the selected location, and a second DES node may be configured to ignore the semantic statement in response to the second DES node's location not matching the selected location.

A given DES node may be configured to successfully execute its identified one or more semantic statements after an automation device has been removed from the given DES node's associated set of one or more automation devices without change in the program instructions. Additionally or alternatively, a given DES node may be configured to successfully execute its identified one or more semantic statements after a new automation device has been added to the given DES node's associated set of one or more automation devices without change in the program instructions.

Also, in some cases, the distinct DES nodes may be organized in a hierarchy, where a given DES node is configured to communicate a result of execution of its identified one or more semantic statements to another, same-level DES node, in response to an interruption in communication between the given DES node and a higher-level DES node.

In another illustrative, non-limiting embodiment, a local DES node may include memory configured to store instructions and processing circuitry coupled to the memory, the processing circuitry configured to execute the instructions to cause the local DES node to: receive semantic code from a head DES node, the semantic code including one or more statements pertaining to one or more devices remotely located with respect to the head DES node; evaluate the semantic code, as part of a discovery operation, to identify a set of the one or more statements that are pertinent to a set of the one or more devices associated with the local DES node; and execute, as part of an execution operation, the identified set of one or more statements with respect to the set of the one or more devices.

For example, to evaluate the semantic code, the processing circuitry may be further configured to execute the instructions to cause the local DES node to identify the set of the one or more statements independently from identification of a second set of the one or more statements by a second local DES node remotely located with respect to the local DES node, the second set of the one or more statements pertaining to a second set of the one or more devices associated with the second local DES node.

Moreover, the semantic code may be such that execution of the identified set of the one or more statements is conditional upon execution of the second set of the one or more statements, the processing circuitry further configured to determine, as part of the discovery operation, to wait for an indication from the head DES node that the second set of the one or more statements has been executed by the second local DES node prior to the local DES node executing the identified set of the one or more statements.

In some implementations, the processing circuitry may be further configured to execute the instructions to cause the local DES node to successfully execute the identified set of the one or more statements in the absence of a change in the semantic code and after a determination that: (i) a given device has been removed from the set of the one or more devices, or (ii) a new device has been added to the set of the one or more devices. The processing circuitry may be further configured to execute the instructions to cause the local DES node to determine that a given device within the set of the one or more devices has software execution capabilities, to compile at least a portion of the identified set of the one or more statements, and to distribute the compiled portion to the given device.

In another illustrative, non-limiting embodiment, a non-transitory computer-readable storage medium may have program instructions stored thereon that, upon execution by a processor within a central computing node, cause the central computing node to: store semantic code, the semantic code including one or more statements invoking interactions with one or more devices remotely located with respect to the computing node; transmit the semantic code to a first local computing node, where the first local computing node is configured to evaluate the semantic code to identify a first set of the one or more statements that is applicable to a first set of the one or more devices associated with the first local computing node, and to execute the first set of the one or more statements; and transmit the semantic code to a second local computing node, where the second local computing node is configured to evaluate the semantic code to identify a second set of the one or more statements that is applicable to a second set of the one or more devices associated with the second local computing node, and to execute the second set of the one or more statements.

In some cases, identification of the first set of the one or more statements by the first local computing node may be independent of the identification of the second set of one or more statements by the second local computing node. Additionally or alternatively, execution of the second set of the one or more statements may be independent from execution of the first set of one or more statements, and the second local computing node may be configured to execute the second set of the one or more statements without knowledge of whether the first set of one or more statements has been executed by the first local computing node.

In some cases, execution of at least one portion of the second set of the one or more statements may be conditional upon execution of the first set of the one or more statements, and the second local DES may be configured to make an autonomous determination to wait for an indication from the central computing node that the first set of the one or more statements has been executed by the first local computing node prior to the second local computing node executing the at least one portion of the second set of the one or more statements. Additionally or alternatively, execution of at least one other portion of the second set of the one or more statements may be independent from execution of the first set of the one or more statements, and the second local computing node may be configured to execute the at least one other portion of the second set of the one or more statements prior to receiving the indication from the central computing node that the first set of the one or more statements has been executed by the first local computing node.

In some implementations, the first local computing node may be configured to execute the first set of the one or more statements after an increase in a number of devices in the first set of one or more devices and in the absence of a corresponding change in the semantic code. Moreover, the first local computing node may be configured to execute the first set of the one or more statements after a decrease in a number of devices in the first set of one or more devices and in the absence of a corresponding change in the semantic code.

For example, the first and second sets of the one or more devices may be automation controllers or sensors. Also, the semantic code may include a sensor fusion algorithm.

In various implementations, one or more of the techniques described herein may be performed by one or more computing systems or electronic devices. For example, an electronic device may include a processor and a memory, the memory configured to store program instructions executable by the processor to perform one or more operations disclosed herein. In other embodiments, a non-transitory computer-readable storage medium may have program instructions stored thereon that, upon execution by one or more computing systems or electronic devices, cause the computing systems or electronic devices to perform one or more operations disclosed herein.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Figure 1:
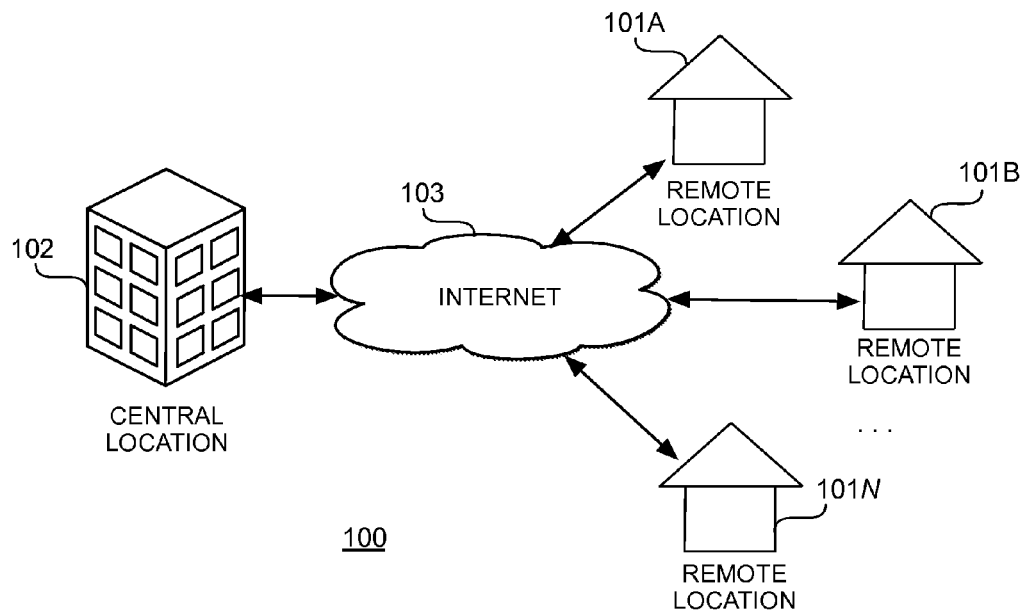
FIG. 1 is a diagram of an example of an environment where certain systems and methods described herein may be employed, according to some embodiments.

Embodiments discussed herein are directed to systems and methods for distributing and executing software code. In some implementations, these systems and methods may be used for distributing and executing software code across computing devices such as, for example, servers, desktops, laptops, tablets, mobile phones, switches, routers, gateways, firewalls, etc.

In other implementations, the systems and methods described herein may be particularly well suited for use with automation and control devices that may be found, for example, in homes, buildings, hotels, retail stores, offices, shopping malls, entertainment venues, hospitals, factories, warehouses, etc. Examples of devices and components that may be controlled in these types of environments include, but are not limited to, lighting, doors, window treatments, security systems, HVAC components, audio and video equipment, medical devices, robotics systems, motors, pumps, valves, machine vision equipment, assembly line devices, etc. In yet other implementations, these systems and methods may be applicable to sensor networks, wireless sensor networks, military sensor networks, environmental sensor networks, traffic sensor networks, surveillance sensor networks, or the like.

In the paragraphs that follow, a system configured to employ one or more of the techniques described herein is referred to as a "Distributed Execution System" (DES). Generally speaking, an entity referred to as "central computing node" or "head DES node" may be configured to distribute symbolic computer instructions or "software code" across multiple "local computing nodes" or "local DES nodes." Each local DES node may be configured to evaluate, interpret, compile, and/or execute the software code based upon the local DES node's specific configuration or capabilities in order to control (or obtain information from) one or more electronic devices (e.g., automation sensors and/or controllers, computers, etc.). In some cases, a local DES node may maintain a direct or network connection with the head DES node, at least some of the time.

"Software code" may be written in any suitable programming or scripting language. Examples of such languages include, but are not limited to, C, C++, PHP, Java, JavaScript, Python, Perl, SQL, Visual Basic, etc. In various implementations, software code may be distributed to local DES nodes without having been compiled such that its semantic meaning in preserved. For example, in some cases, the original source code (e.g., written in JavaScript) may itself be distributed. In other cases, the original source code may be processed prior to distribution, but it may remain in an intermediate state (in a lower level than its original form but still in a higher level than assembly language) such that a local DES node may ascertain its semantic meaning. When the semantic meaning of the software code is discernible; that is, when the code has not yet been compiled and/or when it is not otherwise execution-ready, such code is referred to as "semantic code."

In various embodiments, the systems and methods described herein may enable control and programming of sensor networks and automated systems across different physical locations, or where distributed decision making on the part of local DES nodes is desired. Particularly, a DES system may allow a same rule or statement to be semantically evaluated in different ways at different places. In some cases, a single rule (or set of rules) may be written, even though this rule (or set or rules) may perform differently at different locations.

Additionally or alternatively, source code does not need to be changed when automation devices move between different locations or are removed from the DES. A local DES node at a specific location may be configured to make smart decisions about how it communicates with another device or group of devices. Also, a local DES node may have a sufficient understanding of the system and/or source code to be able to properly execute the code as much as possible, even if network connections are broken or other problems exist.

In some embodiments, a DES system may include one or more of the following features. First, each DES node (i.e., head DES node or local DES node) may be configured to operate in multiple modes of execution. Normally, source code is interpreted in a specific way, such that each symbol has a single meaning. In contrast, here each DES node may be configured to interpret the same semantic code in at least two different ways.

When operating in "discovery mode," a DES node may determine which portions of the semantic code it is responsible for executing and/or which other DES nodes are responsible for executing other portions of the semantic code. The DES node may also determine how to communicate with each of the electronic devices it is responsible for controlling or automating. Then, when operating in "execution mode," a DES node may execute the portion of the semantic code it is responsible for, and it may wait for or send information to other DES node(s) in order to trigger and/or synchronize execution of other portions of the semantic code.

In some embodiments, a single piece of source code may execute across a group of DES nodes at different locations, and the code may behave differently based upon the characteristics of these nodes without action on the part of a user or programmer. An automation or control device may be moved between different locations, or removed entirely, under control of a statement in the source code, and without requiring changes to the source code. The DES may also allow rule execution to change its behavior dynamically based upon the number of devices in a given location, the type of network conditions and the communication system available at each location, etc., again with no effort on the part of the programmer or change in the source code.

To facilitate explanation of the various systems and methods discussed herein, the following description has been split into sections. In the "Overview" section, environments and deployment locations for DES nodes and other devices are described. The "Software" section shows an example of a DES software configured to be executed by a DES node and the "Hardware" section illustrates examples of computing systems and electronic circuitry configured to implement DES nodes. In the "Applications" section, different features of the systems and methods described herein are illustrated. It should be noted, however, that these sections and headings used are for organizational purposes only, and should not be used to limit or otherwise modify the scope of the description or the claims.

I. Overview

Turning to FIG. 1, a diagram of an example of environment 100 where certain systems and methods described herein may be employed is depicted according to some embodiments. As illustrated, one or more electronic devices (shown in FIG. 2), such as automation and control devices, are disposed at one or more remote locations 101A-N. Each of remote locations 101A-N further includes one or more local DES nodes (also shown in FIG. 2). Examples of remote locations 101A-N include, but are not limited to, homes, buildings, hotels, retail stores, offices, shopping malls, entertainment venues, hospitals, factories, warehouses, etc.

Figure 2:
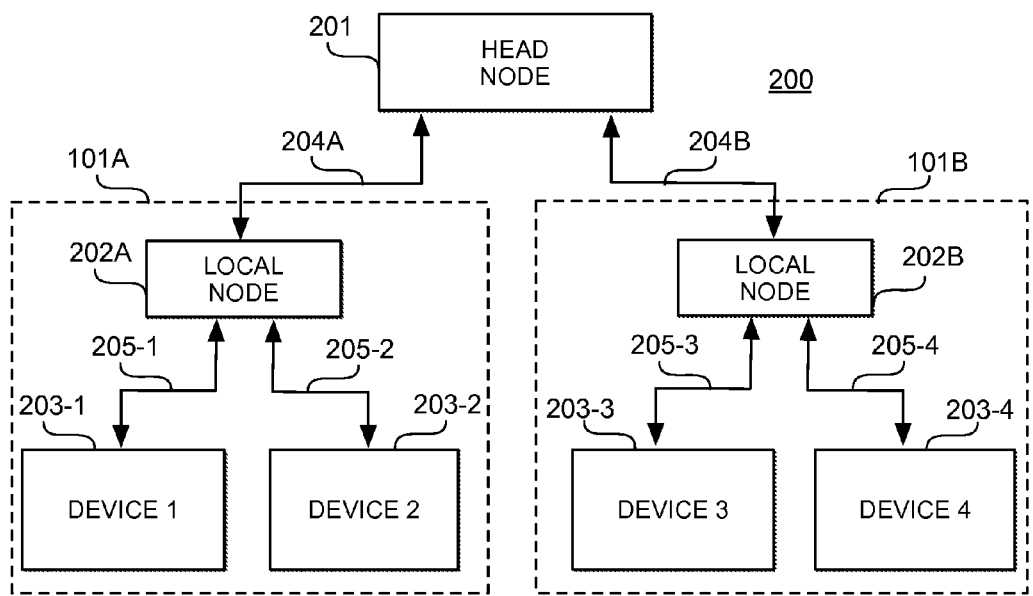
FIG. 2 is a block diagram of an example of a hierarchical Distributed Execution System (DES), according to some embodiments.

Central location 102 includes one or more head DES nodes (shown in FIG. 2). Here central location 102 is shown as being physically separate from all remote locations 101A-N, but it should be understood that, in some cases, central location 102 may be co-located with respect to any one of remote locations 101A-N.

In some embodiments, one or more head DES nodes at central location 102 may be configured to communicate with local DES nodes at remote locations 101A-N via Internet 103. Although labeled as "Internet," in other cases element 103 may be replaced with and/or it may otherwise include any other suitable type of network or combinations of different networks, such as, for example, a Public Switched Telephone Network (PSTN), cellular networks (e.g., 3G, 4G, LTE, etc.), Personal Communication Services (PCS) networks, cable transmission systems, satellite communication systems, electrically conductive transmission lines, fiber optic links, Local Area Networks (LANs), Metropolitan Area Networks (MANs), Wide Area Networks (WANs), intranets, extranets, etc.

Additionally or alternatively, a head DES node at central location 102 may be configured to communicate with local DES nodes at one or more of remote locations 101A-N through a direct connection. For example, a head DES node at central location 102 and a local DES node at one of remote locations 101A-N may each include a compatible wired (e.g., RS-232, Ethernet, USB, FIREWIRE, THUNDERBOLT, etc.) or wireless interface (e.g., WiFi, BLUETOOTH, ZIGBEE, etc.), such that the two nodes may communicate directly with each other.

FIG. 2 is a block diagram of an example of a hierarchical DES deployment 200 according to some embodiments. As shown, central or head DES node 201 is configured to communicate with local DES node 202A disposed at location 101A over communication link or connection 204A. Head DES node 201 is also configured to communicate with local DES node 202B disposed at location 101B over communication link or connection 204B. Local DES node 202A is configured to communicate with automation or control device 203-1 over communication link or connection 205-1 and with automation or control device 203-2 over communication link or connection 205-2. Similarly, local DES node 202B is configured to communicate automation device 203-3 over communication link or connection 205-3 and with automation device 203-4 over communication link or connection 205-4.

In this example, a single head DES 201 is shown, but it should be understood that, generally speaking, any number of head DES nodes may be used. Although only two locations 101A and 101B are depicted, each having a single local DES node 202A and 202B, in other implementations any number of locations having any number of local DES nodes may be used. Moreover, hierarchical DES deployment 200 is illustrated with two levels; a higher level where head DES node 201 resides and a lower level where local DES nodes 202A and 202B reside. In other implementations, however, one or more intermediate levels may be employed with intermediate DES nodes (not shown) similar to head DES 201 and/or local DES nodes 202A/B.

Figure 4:
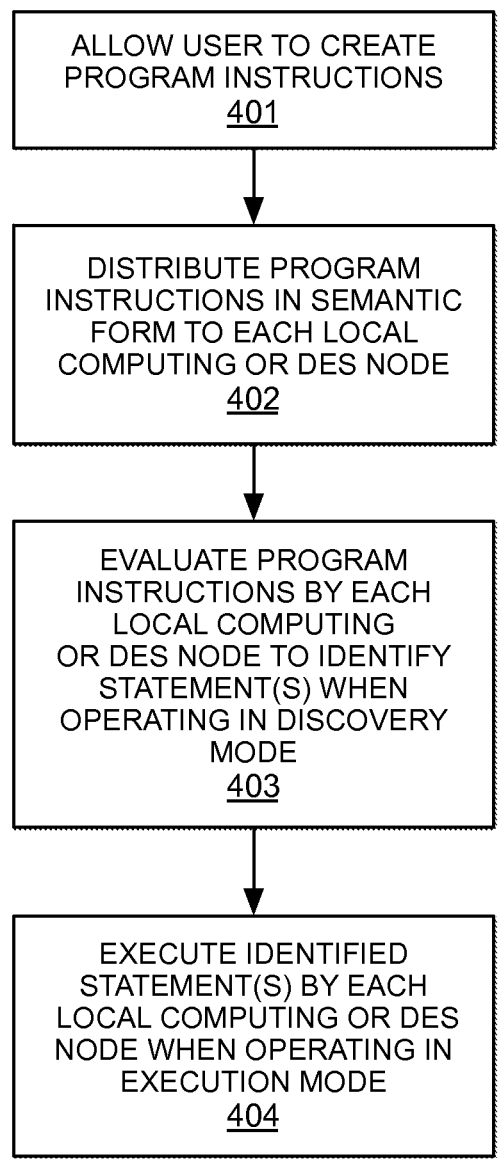
FIG. 4 is a flowchart of an example of a method for distributing and executing software code, according to some embodiments.
Figure 5:
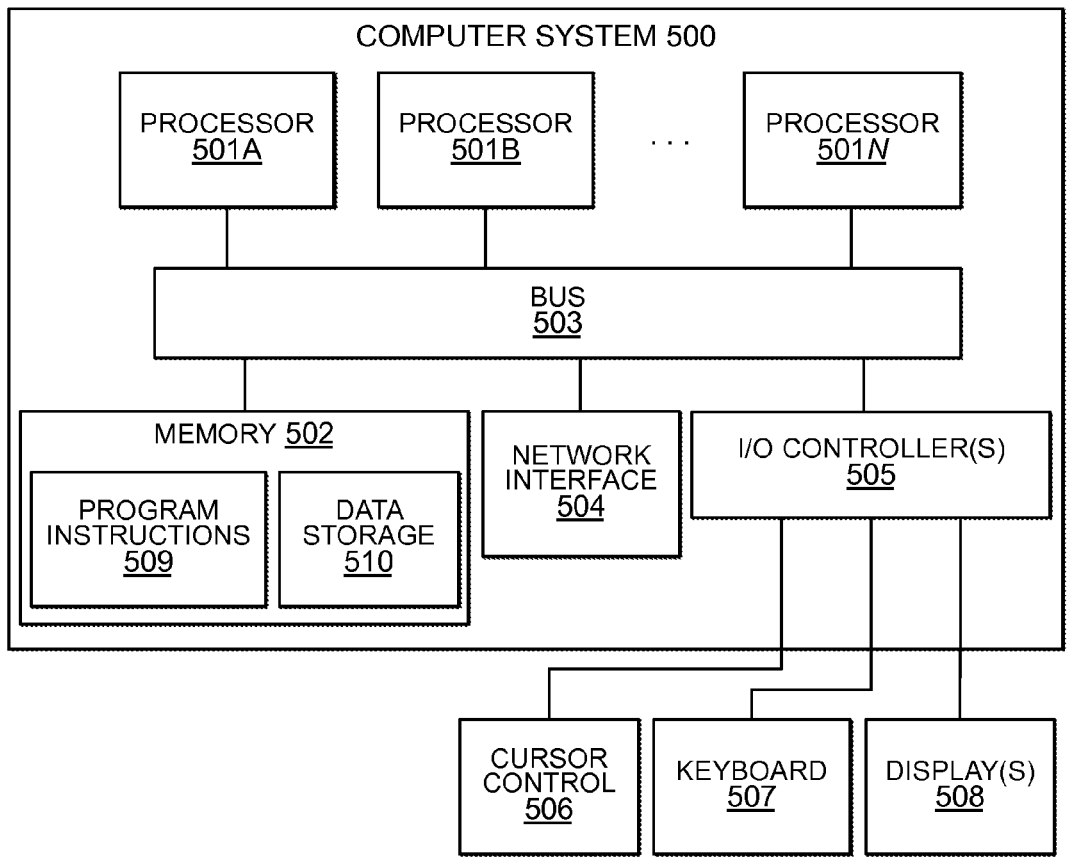
FIG. 5 is a block diagram of an example of a computer system configured to implement a computing or DES node, according to some embodiments.

Examples of computing devices and other hardware circuitry configured to implement head DES node 201 and local DES nodes 202A/B are shown in FIGS. 4 and 5. In some implementations, devices 203-1 through 203-4 may include any sensor, transducer, or controller that may be used automation and control applications. Examples of sensors and controllers may include, but are not limited to, ultrasonic, photoelectric, fiber optic, laser measurement, color and brightness, vision systems, proximity, barcode scanners, encoders, vacuum and pressure, flow, temperature, mechanical, electrical, etc. Examples of controllers may include, but are not limited to, actuators, motors, power supplies, switches, latches, relays, lights, alarms, logic modules, counters and timers, meters, etc. In other implementations, automation devices 203-1 through 203-4 may be replaced with a computer system or other DES node.

In some embodiments, communication links or connections 204-A/B may be established over Internet 103 shown in FIG. 1, whereas communication links or connections 205-1 through 205-4 may be established via direct or local network connections between devices 203-1 through 203-4 and their respective local DES nodes 202A and 202B. Accordingly, in some situations, devices 203-1 and 203-2 in location 101A may be remotely located with respect to devices 203-3 and 203-4 in location 101B, and each of locations 101A and 101B may be remotely located with respect to head DES node 201. In that regard, it should be noted that the communication protocols used in each of communication links or connections 204-A/B and 205-1 through 205-4 may be different from each other.

As previously noted, in some situations, head DES node 201 may be located in one of locations 101A or 101B. For example, with respect to location 101A, a single computing device may implement both head DES node 201 and local DES node 202A. Additionally or alternatively, in some cases, device 203-1 and/or device 203-2 may be integrated into local DES node 202A.

Before continuing with the description of FIG. 2, briefly consider the problem of executing a software program such as, for example, an automation program, across locations 101A and 101B. Assume, for sake of illustration, that a portion of the software code is as follows:

```
If <Device 1> has <Condition X>, then
    If <Device 2> has <Condition X>, then
        If <Device 3> has <Condition X>, then
            If <Device 4> has <Condition X>, then do Y.
```

In one scenario, referred to herein as "central execution," the software would be compiled and executed by a central computing system in the position of head DES node 201, and local DES nodes 202A and 202B would be absent; that is, the central computing system would communicate with each of devices 203-1 though 203-4 directly. In order to execute the software, at least one query and reply between such a central computing system and devices 203-1 though 203-4 would take place. Assume that the latency in the communication channels is such that sending or receiving each message to or from any of devices 203-1 through 203-4 takes 150 milliseconds. Thus, in this example, the total latency would be 8×150 milliseconds, or 1.2 seconds.

An attempt to address the latency issue is to perform different parts of the execution at locations 101A or 101B, which is referred to as "distributed execution." For instance, still with a central computing system in the position of head DES node 201 but now also with a first local computing system in the position of local DES node 202A and a second local computing system in the position of local DES 202B, the first two lines of the foregoing software code may now be executed at location 101A by the first local computing system and the second two lines may be executed at location 101B by the second local computing system.

For instance, if the latency of the previous example was such that 100 of the 150 milliseconds is attributed to each of links 204A and 204B between the central computing system and each local computing system, and 50 of the 150 milliseconds is attributed to each link 205-1 through 205-4 between each local computing system and its respective devices 203-1 through 203-4, the same software code described above would be executed with a latency of only 800 milliseconds (versus the 1.2 seconds of the previous example) because the 100 millisecond link between the central computing system and each location 101A and 101B would be traversed 4 fewer times.

Despite an improvement in speed of execution, however, the distributed execution approach has its own problems. For example, distributed execution typically requires that multiple programs be created, one or each location, which takes time and effort, and increases system complexity. Also, where there are changes in the DES system's configuration (e.g., when a device is moved to another location), those changes immediately require some adjustment in the multiple programs involved. Furthermore, any change in the overall system's goal may require a change in multiple programs, which again must then be distributed to each remote location.

Now, referring back to FIG. 2, the systems and methods described herein may address these, and other problems, by combining aspects of central execution with aspects of distributed execution so that a single software code needs to be written and maintained (which has the simplicity of design of a central execution system) at head DES 201. Yet, the system of FIG. 2 may also provide the speed advantages of distributed execution by executing portions of the software code at local DES nodes 202A and 202B. In addition, the systems and methods described herein may be capable of dealing with configuration changes, such as the movement of devices 203-1 through 203-4 to different locations, addition of new devices, or removal of existing devices, without changes to the software code at head DES 201.

In order to accomplish one or more of these goals, head DES 201 may be configured to distribute source code in semantic form to each of local DES nodes 202A and 202B. Also, each of local DES nodes 202A and 202B may be configured to evaluate the semantic code differently in different modes of operation.

In "discovery mode," each of local DES nodes 202A and 202B may be configured to determine where devices 203-1 through 203-4 are located, and which DES node is responsible for a given device's control or information. Head DES 201 may also operate in discovery mode to determine which local DES nodes 202A and 202B are available, and their respective devices. Upon completion of the discovery mode, all DES nodes have determined, for each portion of the semantic code, whether that portion applies to their own devices or whether they should ask another DES node for the result(s) of that code portion. Each DES node may keep determinations made in discovery mode to be used in execution mode.

In "execution mode" following "discovery mode," knowing the discovery information, each of local DES nodes 202A and 202B may execute the portion of the semantic code that it has determined its is responsible for. Each local DES node 202A and 202B may communicate with its respective devices 205-1 through 205-4 to execute its code portion and/or it may communicate with other DES nodes (e.g., head DES 201 or other local DES node) when needed to transmit or receive information.

II. Software

Figure 3:
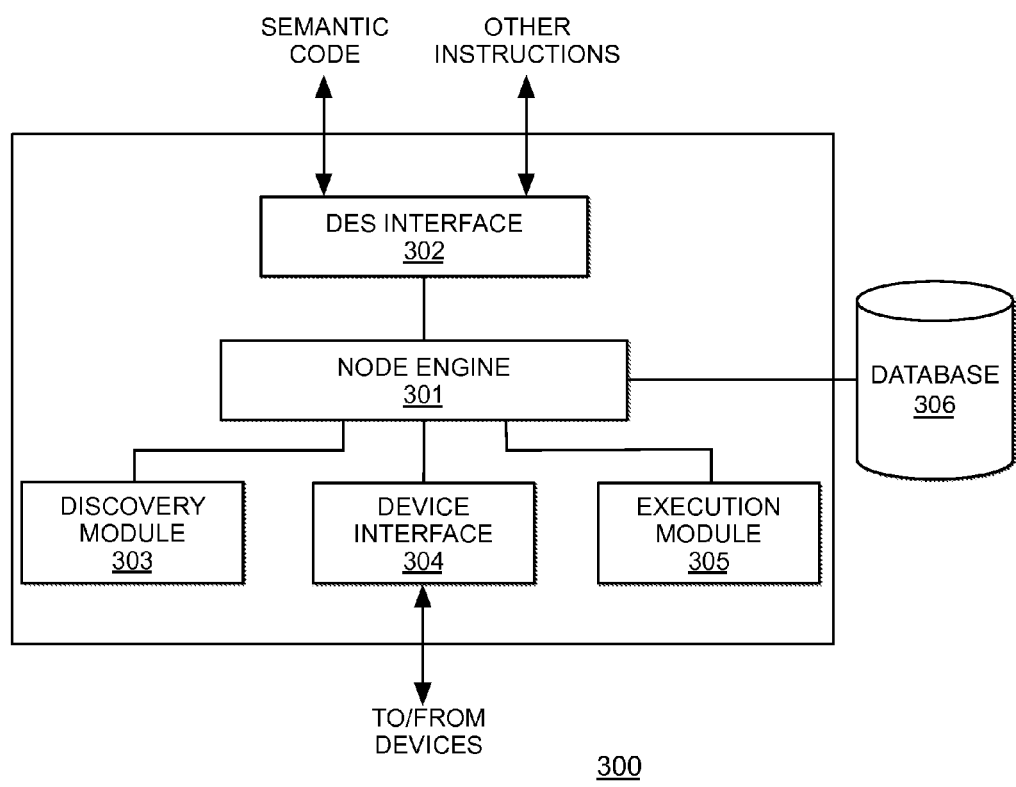
FIG. 3 is a block diagram of an example software program configured to be executed by a DES node, according to some embodiments.

Turning to FIG. 3, a block diagram of an example software program 300 is depicted. In some embodiments, software 300 may be executed by a DES node (e.g., head DES node 201 or local DES nodes 202A/B). As illustrated, node engine 301 is coupled to DES interface 302, discovery module 303, device interface 304, execution module 305, and database 306.

In operation, DES interface 302 is configured to receive semantic code (e.g., from head DES node 201) and/or to facilitate communications between DES nodes under control of node engine 301. Node engine 301 may store the semantic code in database 306, and it may allow discovery module 303 to evaluate the semantic code. For example, discovery module 303 may examine each line or statement in the semantic code and determine whether the statement invokes interaction with a given one of the node's devices (e.g., in the case of local DES node 202A, devices 203-1 or 203-2).

In some cases, prior to evaluating the semantic code, discovery module 303 may conduct a survey of the devices for which the node is responsible, and may store that information in database 306. The survey may be performed, for example, via device interface 304. After the initial survey is conducted, additional surveys may also be performed periodically to update the list of devices, for example, upon request by another DES node (e.g., head DES node 201), or upon detection of a triggering event (e.g., a previously connected device goes silent for a period of time or an unknown device attempts to communicate over a communication channel.

After the operations performed by discovery module 303 are completed, node engine 301 may determine which statements in the semantic code will be executed by execution module 304 when the node is operating in execution mode, which statements may be ignored during in execution mode, which statements require an instruction from another DES node (e.g., from head DES node 201 via DES interface 302) prior to it being allowed to execute, etc. Then, when operating in execution mode, node engine 301 may control execution module 303 to communicate with devices via device interface 304 in order to actually carry out the relevant semantic instructions. In some cases, results from the execution module may also be stored in database 206.

In some embodiments, software 300 may perform a number of additional operations including, but not limited to, re-routing broken network connections from a given DES node to another DES node, deciding whether to broadcast a message to the node's devices, etc. These and other operations are described in the "Applications" section below.

In some embodiments, the modules or blocks shown in FIG. 3 may represent sets of software routines, logic functions, and/or data structures that, when executed by hardware circuitry, perform the specified operations. Although these modules are shown as distinct logical blocks, in other embodiments at least some of the operations performed by these modules may be combined in to fewer blocks. For example, in some cases, discovery module 303 may be combined with execution module 305. Conversely, any given one of modules 301-306 may be implemented such that its operations are divided among two or more logical blocks. Although shown with a particular configuration, in other embodiments these various modules or blocks may be rearranged in other suitable ways.

FIG. 4 is a flowchart of an example of method 400 for distributing and executing software code. In some embodiment, method 400 may be performed by software 300 of FIG. 3 upon its execution by one or more DES nodes. At block 401, method 400 includes allowing a user to create program instructions intended to automate or control the operation of devices 203-1 through 203-4 shown in FIG. 2. For example, the user may write software code (in the form of source code) while operating head DES node 201. Then, at block 402, head DES node 201 distributes the program instructions in the form of semantic code (that is, source code or other intermediate, un-compiled format) to each of local computing or DES nodes 202A and 202B.

At block 403, each of head DES node 201 and local DES nodes 202A and 202B may operate in discovery mode to evaluate the semantic code and therefore identify one or more statements within the code that are applicable to that node. In some cases, evaluation of the semantic code may be performed, for example, though just-in-time (JIT) compilation or as simpler script interpretation. During the evaluation, the semantics of the code may be used to discover which devices are needed for the rule execution, and where those devices are located.

As an example of operations that may take place during discovery mode, consider the same code set forth in the "Overview" section, repeated here for sake of convenience:

```
If <Device 1> has <Condition X>, then
    If <Device 2> has <Condition X>, then
        If <Device 3> has <Condition X>, then
            If <Device 4> has <Condition X>, then do Y.
```

In this case, the results of block 403 are as follows. First, head DES node 201 determines that the first two statements require information obtained from local DES node 202A at location 101A. Head DES node 201 also determines that, upon receiving the required information, it will tell local DES node 203B at location 101B to execute the two subsequent code statements. In addition, head DES node 201 determines that, upon local DES node 203B's successful execution of its respective code portion (e.g., without errors or failures), head DES 201 will do "Y." Meanwhile, local DES node 202A determines that the semantic code starts with something happening at device 203-1 ("device 1"), so it will wait for "condition X" to materialize, and, when it does, it will check on the status of device 203-2 ("device 2") for "condition X." Conversely, local DES node 202B determines that the code begins with an operation at a different location, so it will wait for an indication from head DES node 201 to execute its respective portion of code. Again, this analysis of the semantic code by each DES node occurs during the discovery phase, prior to actual execution of the code.

Then, at block 404, method 400 involves the execution of the identified statements by each local DES node 202A and 202B operating in execution mode. Here, using the information obtained in discovery mode, each statement may now be executed. It is important to note that each DES node 202A and 202B still has the same semantic code, but the code is now evaluated or executed in different manner.

Particularly, still referencing the same code as before, execution from head DES node 201's perspective begins with it waiting for the successful execution of the first two statements by local DES node 202A. If head DES node 201 receives a "true," that is, both conditions were satisfied at location 101A, then head DES node 201 tells local DES node 202B to execute its portion of code. Head DES node 201 then waits for results from location 101B which, if also true, cause head DES 201 to do "Y."

From local DES node 202A's perspective, it begins executing the first two statements. If device 203-1 meets "condition X" and device 203-2 also meets "condition X," then local DES node 202A returns a "true" value or signal to head DES node 201; otherwise it returns a "false" value. From local DES node 202B's perspective, it waits until head DES node 201 commands it to execute its code portion. When so instructed, local DES node 202B checks to see if device 203-3 has "condition X," and when whether device 203-4 has the same condition. If so, local DES node 202B returns a "true" value or signal to head DES node 201; otherwise it returns a "false" value.

To better appreciate some of the advantages of the foregoing techniques, consider a situation where device 203-2 is moved from location 101A to location 101B without modification of the source code at head DES 201. Now, when discovery mode is run, each local DES node identifies new information.

Specifically, local DES node 202A determines that the first statement invokes an interaction with device 203-1, but that all other statements are related to other devices outside of location 101A. Thus, during discovery mode, local DES node 202A determines that, when operating in execution mode, it will check device 203-1 for "condition X," and then it will tell head DES node 201 whether the statement was true or false. Meanwhile, local DES node 202B determines that the second through fourth statements invoke interactions with devices 203-2 through 203-4 at location 101B. Thus, during discovery mode, local DES node 202B determines that, when operating in execution mode, it will check devices 203-2 through 203-4 for "condition X" upon receiving an instruction to do so from head DES node 201, and then it will return a true or false value depending upon the outcome of the execution.

In execution mode, head DES node 201 waits upon execution of the first statement by local DES node 202A. If head DES node 201 receives a "true," that is, the first condition is satisfied at location 101A, then head DES node 201 tells local DES 202B to execute its portion of code, which has been determined to involve the three subsequent statements. Head DES node 201 then waits for results from location 101B, which, if also true, cause head DES node 201 to do "Y."

Thus, despite the change in system configuration, no corresponding change needs to be made in the overall program to achieve the same overall results. Because the software instructions are semantically interpreted in different ways during discovery and execution modes, the system is capable of adjusting, adapting, or self-modifying itself to changes in the system's configuration without modification of the source code. This process occurs in a distributed fashion, as each DRS node is running discovery mode based on its particular capabilities. In some embodiments, these capabilities may result from self-discovery operations, information obtained from head DRS 201, a database system, etc.

III. Hardware

In some embodiments, head DES node 201 and/or local DES nodes 202A/B may be implemented or executed by one or more computer systems, an example of which is illustrated in FIG. 5. In various embodiments, computer system 500 may be a server, a mainframe computer system, a workstation, a network computer, a desktop computer, a laptop, or the like.

As illustrated, computer system 500 includes one or more processors 501A-N coupled to a system memory 502 via bus 503. Computer system 500 further includes network interface 504 coupled to bus 503, and input/output (I/O) controller(s) 505, coupled to devices such as cursor control device 506, keyboard 507, and display(s) 508. In some embodiments, a given entity (e.g., head DES node 201) may be implemented using a single instance of computer system 500, while in other embodiments multiple such systems, or multiple nodes making up computer system 500, may be configured to host different portions or instances of embodiments.

In various embodiments, computer system 500 may be a single-processor system including one processor 501A, or a multi-processor system including two or more processors 501A-N (e.g., two, four, eight, or another suitable number). Processor(s) 501A-N may be any processor capable of executing program instructions. For example, in various embodiments, processor(s) 501A-N may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processor(s) 501A-N may commonly, but not necessarily, implement the same ISA. Also, in some embodiments, at least one processor(s) 501A-N may be a graphics processing unit (GPU) or other dedicated graphics-rendering device.

System memory 502 may be configured to store program instructions and/or data accessible by processor(s) 501A-N. For example, memory 502 may be used to store software program 300 and/or database 306 shown in FIG. 3. In various embodiments, system memory 502 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described above, may be stored within system memory 502 as program instructions 509 and data storage 510, respectively. In other embodiments, program instructions and/or data may be received, sent or stored upon different types of computer-accessible media or on similar media separate from system memory 502 or computer system 500. Generally speaking, a computer-accessible medium may include any tangible, non-transitory storage media or memory media such as electronic, magnetic, or optical media—e.g., disk or CD/DVD-ROM coupled to computer system 500 via bus 503, or non-volatile memory storage (e.g., "flash" memory)

The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, bus 503 may be configured to coordinate I/O traffic between processor 501, system memory 502, and any peripheral devices including network interface 504 or other peripheral interfaces, connected via I/O controller(s) 505. In some embodiments, bus 503 may perform any necessary protocol, timing or other data transformations to convert data signals from one component (e.g., system memory 502) into a format suitable for use by another component (e.g., processor(s) 501A-N). In some embodiments, bus 503 may include support for devices attached through various types of peripheral buses, such as a variant of the Peripheral Component Interconnect (PCI) bus standard or the Universal Serial Bus (USB) standard, for example. In some embodiments, the operations of bus 503 may be split into two or more separate components, such as a north bridge and a south bridge, for example. In addition, in some embodiments some or all of the operations of bus 503, such as an interface to system memory 502, may be incorporated directly into processor(s) 501A-N.

Network interface 504 may be configured to allow data to be exchanged between computer system 500 and other devices, such as other computer systems attached to network 103, or devices 203-1 through 203-4 in FIG. 2, for example. In various embodiments, network interface 504 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

I/O controller(s) 505 may, in some embodiments, enable connection to one or more display terminals, keyboards, keypads, touch screens, scanning devices, voice or optical recognition devices, or any other devices suitable for entering or retrieving data by one or more computer system 500. Multiple input/output devices may be present in computer system 500 or may be distributed on various nodes of computer system 500. In some embodiments, similar I/O devices may be separate from computer system 500 and may interact with computer system 500 through a wired or wireless connection, such as over network interface 504.

As shown in FIG. 5, memory 502 may include program instructions 509, configured to implement certain embodiments described herein, and data storage 510, comprising various data accessible by program instructions 509. In an embodiment, program instructions 509 may include software elements of embodiments illustrated in FIG. 3. For example, program instructions 509 may be implemented in various embodiments using any desired programming language, scripting language, or combination of programming languages and/or scripting languages. Data storage 510 may include data that may be used in these embodiments such as, for example, database 306. In other embodiments, other or different software elements and data may be included.

A person of ordinary skill in the art will appreciate that computer system 500 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be performed and/or other additional operations may be available. Accordingly, systems and methods described herein may be implemented or executed with other computer system configurations.

Figure 6:
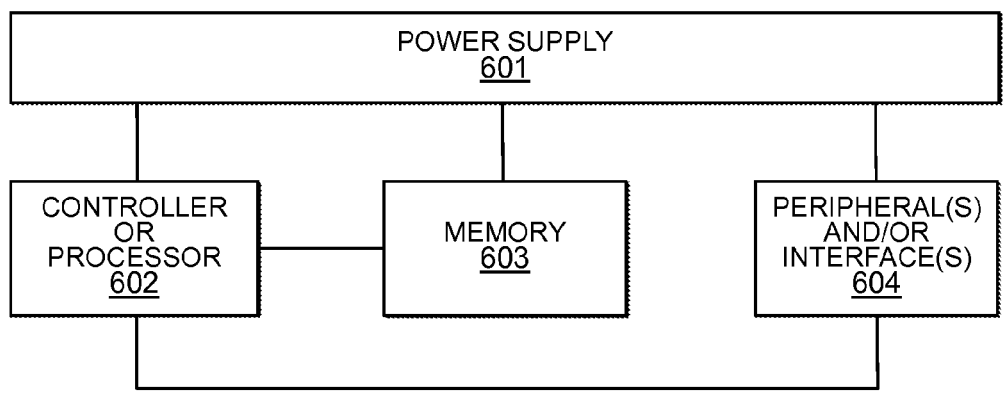
FIG. 6 is a block diagram of an example of an electronic device configured to implement another computing or DES node, according to some embodiments.

FIG. 6 is a block diagram of an example of electronic device 600 that may implement one of head DES node 201 and/or local DES nodes 202A/B. In some embodiments, device 600 may be designed as or it may otherwise include an Integrated Circuit (IC), Application Specific Integrated Circuit (ASIC), System-on-Chip (SoC), etc. As illustrated, device 600 includes processor and/or controller circuitry 602, memory circuitry 603, and peripheral and/or interface circuitry 604. Power supply circuitry 601 may be configured to provide analog and/or digital voltage levels to each of components 602-604. In some cases, a single DES node may include a single instance of device 600. In other cases, however, a single DES node may include two or more instances of device 600.

Processor and/or controller circuitry 602 may include any suitable type of controller device, such as, for example, an ARM architecture-based processor or microcontroller, a POWERPC architecture-based processor or microcontroller, etc. Memory circuitry 603 may include any suitable type of memory. For example, memory circuitry 603 may include SRAM, nonvolatile RAM (NVRAM, such as "flash" memory), and/or dynamic RAM (DRAM) such as synchronous DRAM (SDRAM), double data rate (DDR, DDR2, DDR3, etc.) SDRAM, etc. Memory circuitry 303 may also include one or more memory modules to which the memory devices are mounted, such as single inline memory modules (SIMMs), dual inline memory modules (DIMMs), etc. In some implementations, memory circuitry 603 may be configured to store information such as source code or semantic code, an identification of devices 203-1 through 203-4, an identification of other local DES nodes, other information ascertained during a discovery mode of operation, etc.

Peripheral(s) and/or interface(s) 604 may include any desired circuitry, depending on the type of devices 203-1 through 203-4 that a DES node is responsible for controlling or automating. For example, in some implementations, devices 203-1 through 203-4 may include a transducer or sensor, and thus peripheral(s) 304 may include circuitry suitable to interface controller 302 with such a sensor. In other implementations, devices 203-1 through 203-4 may include an electromagnetic component or actuator, and peripheral(s) 604 may include circuitry suitable to interface controller 602 with such an actuator. Additionally or alternatively, peripheral(s) and/or interface(s) 604 may include devices configured to perform one or more types of wireless communication, such as Wi-Fi, 6lowPAN, ZIGBEE, DASH7, BLUETOOTH, cellular, GPS, etc.

In some embodiments, the modules or blocks shown in FIG. 6 may represent processing circuitry and/or sets of software routines, logic functions, and/or data structures that, when executed by the processing circuitry, perform specified operations. Although these modules are shown as distinct logical blocks, in other embodiments at least some of the operations performed by these modules may be combined in to fewer blocks. For example, in some cases, memory circuitry 603 may be combined with controller or processor 602. Conversely, memory circuitry 603 may be implemented as two or more components. Although shown with a particular configuration, in other embodiments these various modules or blocks may be rearranged in other suitable ways.

IV. Applications

This section describes additional applications and examples that further elaborate on some of the systems and methods discussed above. In some embodiments, these various applications may be implemented via software 300 shown in FIG. 3.

A. Selectors

In some applications, various types of programmable or controllable entities may be categorized into different "categories," also referred to as "interfaces" or "facades." Generally speaking, a categorization method allows software to treat an entity as a "generic X" if the entity is categorized as an "X." In a control and automation environment, or in a sensor network system, these devices often represent physical objects. For example, the following code may be used to turn on all devices categorized as "lights":

devJS.selectAll("light").setOn(true)

Figure 7:
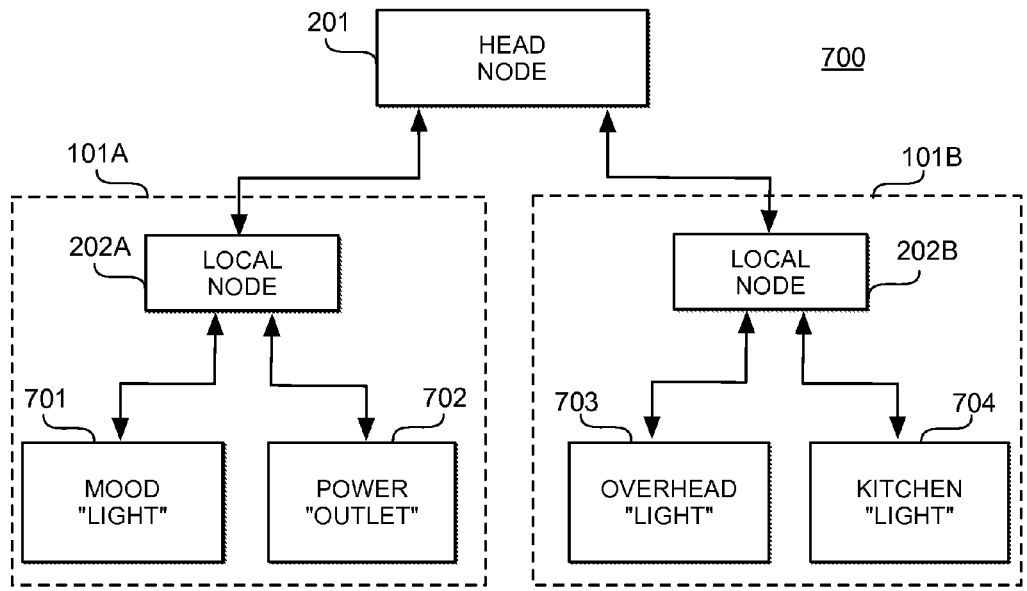
FIG. 7 is a block diagram illustrating an example of a selector application, according to some embodiments.

In that regard, FIG. 7 is a block diagram illustrating example 700 of a selector application according to some embodiments. Here, when local DES nodes 202A/B receive this semantic statement and operate in discovery mode, each of them evaluates the statement to determine if they have any devices of "light" categorization or type. Thus, local DES node 202A identifies device 701 but not 702, and local DES node 202B identifies both devices 703 and 704. Then, when local DES nodes 202A/B operate in execution mode, each identified device 701, 703, and 704 is turned on by its respective node. Similarly as noted previously, in this example, if any "light" is moved to a different location or removed from the system, it does not require a change in the semantic statement.

B. Locations

It is often desired that only devices in a specific location or set of locations should be controlled. For instance, the following statement is intended to turn on all devices fitting the "light" category in location A:

devJS.location("A").selectAll("light").setOn(true)

Referring back to example 700 in FIG. 7, during discovery mode, head DES node 201 determines it should only wait on location 101A for execution. Still during discovery mode, local DES node 202A determines that it will turn on device 701 later during execution, whereas local DES node 202B determines that the statement does not apply to it and may therefore be ignored.

C. Triggering

In some applications, the DES may be able to effectively monitor devices for events, as well as push instructions to devices. This is of particular importance in systems that have sensor devices and where devices can provide feedback, which is information that may be used to make decisions later. As an example, consider the following code:

```
devJS.selectAll("hasTemp")
.when(function(d){
    if( d.temp < 30) return true; else return false;
})
.then(function(d) {
    devJS.doThisNow( );
});
```

Figure 8:
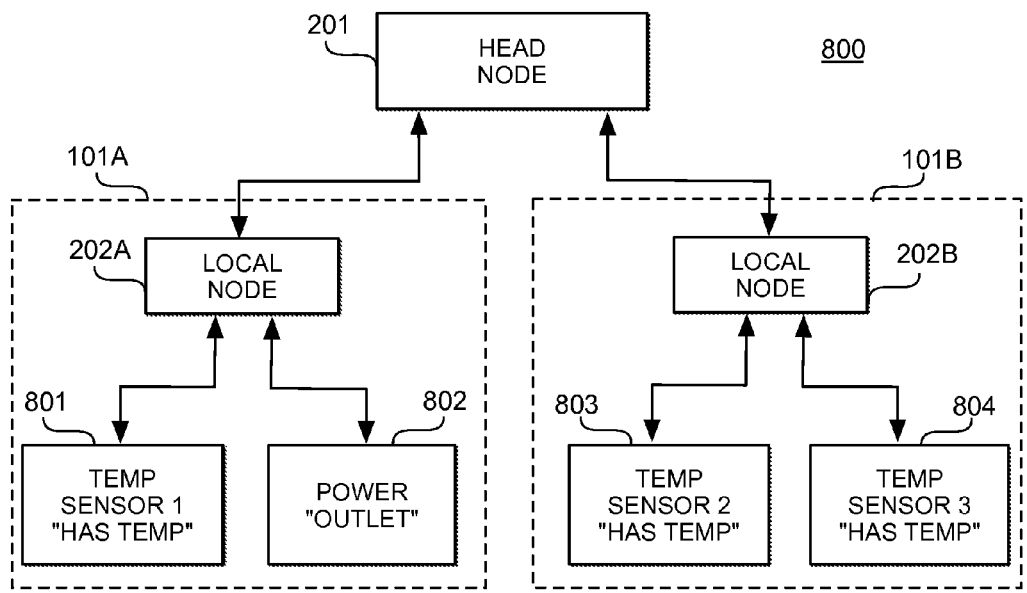
FIG. 8 is a block diagram illustrating an example of a triggering application, according to some embodiments.

Here the "when" portion of the code is the "trigger." Referring to FIG. 8, a block diagram illustrating example 800 of a triggering application is depicted according to some embodiments. Here, the foregoing code will execute whenever any "hasTemp" device detects a temperature change. In discovery mode, local DES node 202A identifies device 801, and local DES node 202B identifies "hasTemp" devices 803 and 804. When a temperature change occurs on these sensors, the statement:

```
function(d){ if( d.temp < 30) return true; else return false; }
``` executes. This statement determines whether another piece of code should run. Thus, discovery mode allows the DES to determine which local DES nodes should execute the code. In execution mode, each listening hook is setup for each local DES node, that will execute the above statement.

This software design pattern also allows aggregate information from sensors to be processed, even if some sensors move, turn off, or are removed from the system, without any code changes. As an example, assume that the "when" portion of the code is changed to:

```
.when(function(d){
    if ( d.All( ).temp.Average( ) < 30) return true; else
return false;
    })
```

Now the DES should look at the average temperature of all "hasTemp" devices 801, 803, and 804, instead of a single device. Yet, the rule is still triggered when any of the "hasTemp" devices detects a temperature change, regardless of how many devices are in the system or where these devices are located. Again, as in other examples, if the temperature sensors are moved or removed from the system, the original source code requires no change.

D. Robustness

In some systems, network connections between physical locations, and, consequently, between different DES nodes, may become temporarily unavailable. When head DES node 201 passes the entire semantic meaning of the code to each local DES node 202A/B, however, even if these connections drop, operation is still possible.

Figure 9:
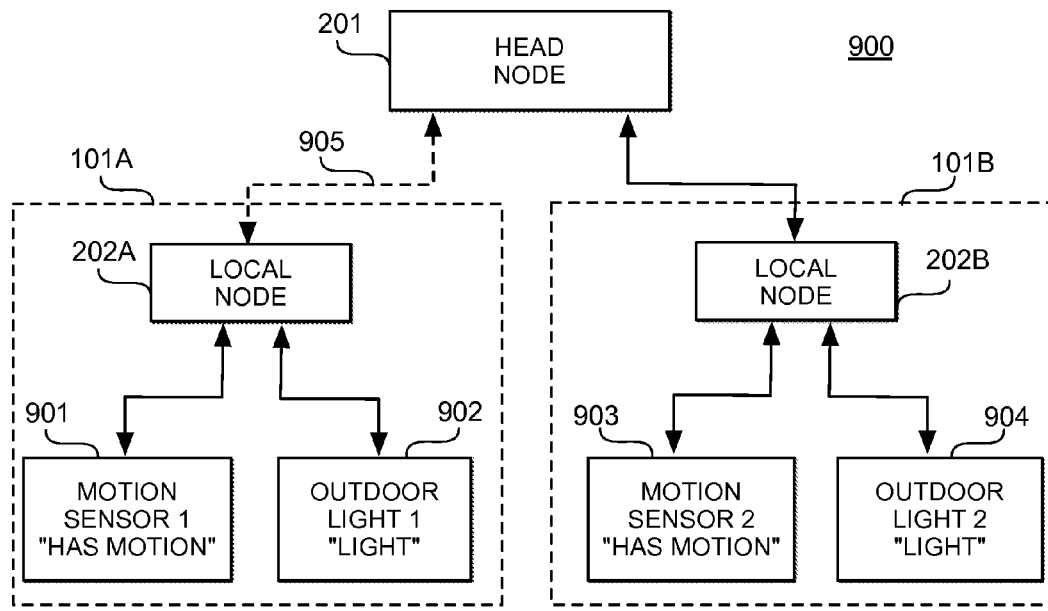
FIG. 9 is a block diagram illustrating an example of a redundancy application, according to some embodiments.

FIG. 9 is a block diagram illustrating example 900 of a redundancy application, according to some embodiments. In this example, the software code is as follows:

```
devJS.selectAll("hasMotion")
    .when(function(d){ return d.motion; })
    .then(function(d) {
        devJS.selectAll("light").setOn(true);
    });
```

In other words, when motion sensors 901 or 903 go off in either location 101A or 101B, it causes lights 902 and 904 to be turned on in both locations. As indicated in example 900, communication link 905 (dotted line) between head DES node 201 and local DES node 202A is temporarily not working. Assume, however, that the semantic meaning of the code has already been passed to local DES node 202A. (Also, for sake of simplicity, "d.motion" simply returns "true" or "false").

Because each DES node has an understanding of the semantics of the code, even if connection 905 remains down, if motion sensor 901 in location 101A is triggered, the "then" portion of the code will execute at local DES node 202A. Outdoor light 902 will be set to "On." Because link 905 is not working, local DES node 202A may be unable to inform head DES 201 of the event, so no other action is taken (i.e., outdoor light 904 is not turned on at location 101B).

Then, if motion sensor 903 in location 202B is triggered, the "then" portion will execute at local DES node 202B. Head DES node 201 will be informed and then outdoor light 904 will be set to "On." If network connection 905 is re-established within a predetermined amount of time, then local DES node 202A and head DES node 201 will send their messages, and lights will be turned on at the corresponding locations.

In short, in some embodiments, the techniques described herein illustrate yet another distinction with respect to traditional systems in that rule triggering may continue even if the "head" device is not available, and even if the "head" device is otherwise involved in the rule.

Figure 10:
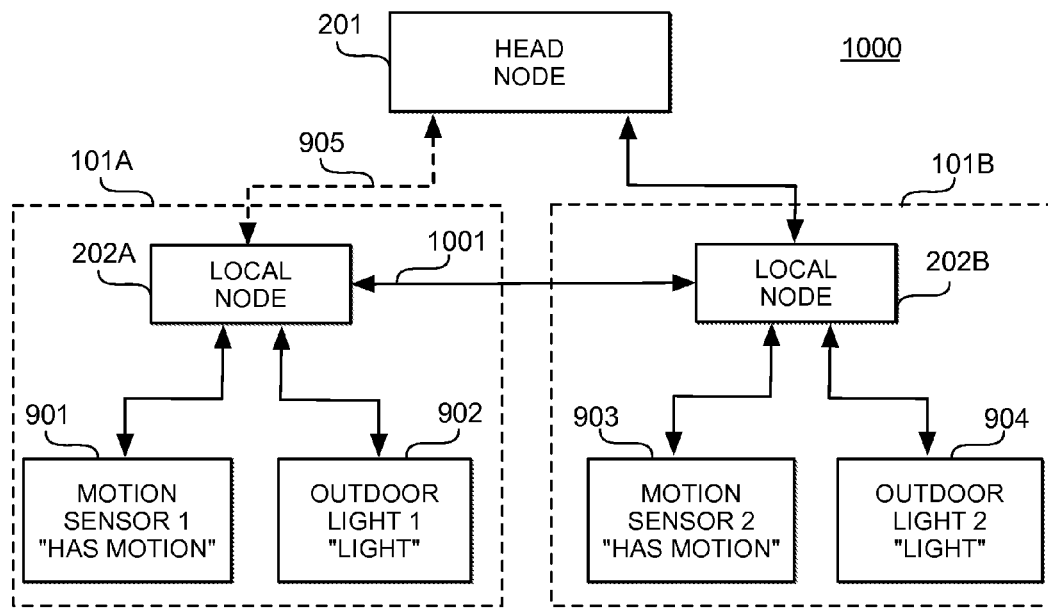
FIG. 10 is a block diagram illustrating an example of a re-routing application, according to some embodiments.

In other embodiments, re-routing may be used as follows. Particularly, FIG. 10 is a block diagram illustrating example 1000 of a re-routing application. Here, connection 905 between local DES node 202A and head DES node 201 is still down, but local DES node 202A and local DES node 202B are able to communicate with each other via another network connection 1001. In these cases, the software code may be allowed to execute in full through cooperation between local DES nodes 202A/B in passing messages between themselves and head DES node 201, which may be of particular value in mesh networks or the like.

E. Execution Speed and Efficiency

Figure 11:
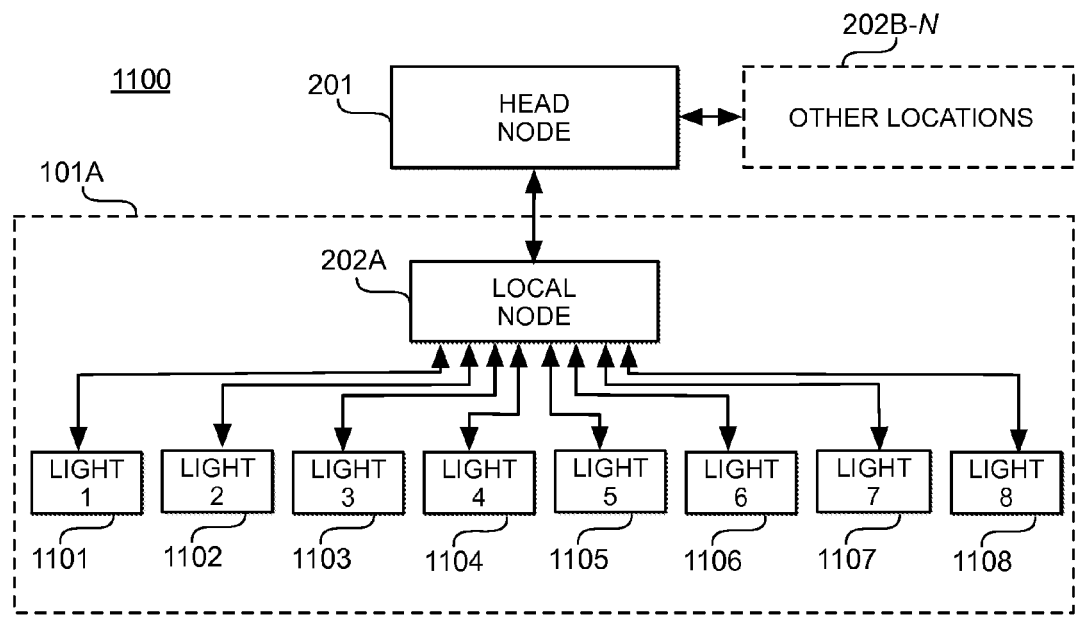
FIG. 11 is a block diagram illustrating an example of a broadcasting application, according to some embodiments.

Because each local DES node receives software code with its semantic symbolic meaning, the DES can make intelligent decisions about how to execute a rule during discovery or execution mode. For example, FIG. 11 is a block diagram illustrating example 1100 of a broadcasting application. Specifically, example 1100 has a plurality of lights 1101-1108 in a single location 101A. Consider the following software instruction:

devJS.location("A").selectAll("light").setOn(true);

This same statement may be passed down to location 101A. During discovery mode, local DES node 202A sees that it will be possible to send the same command to many lights at once. It then determines that this message can be sent as a broadcast instead of single message to each light, for example, based upon the communications capabilities at location 101A and/or the speed at which it can talk to each of devices 1101-1108.

Using a broadcast command, local DES node 202A is able to more efficiently, specifically more quickly and with less network traffic, tell each of devices 1101-1108 to turn on. With this knowledge, during execution mode, local DES node 202A sends a broadcast with single message (e.g., "if you are light turn on") to the entire location 101A's device communication channel.

This same decision-making process may be used across devices, network and different communication channels. Note that a programmer writing the source code did not need any knowledge about the network or device communication system for the statement to be executed efficiently, and no effort was required on the rule programmer to make this more efficient. If location 101A later has fewer devices, local DES node 202A may, again during discovery mode, determine that single messages to each device is more effective.

Accordingly, the systems and method described herein may enable a DES system to adjust its behavior based upon network conditions, number of devices, and/or installation properties without having to change the programming of the behavior of the entire system.

F. Sensor Fusion

The term "sensor fusion" refers to the use of multiple sensors to make an overall decision or determination about an environment. In some embodiments, a DES system as described herein makes sensor fusion easier because a local DES node may be capable of making decisions physically close where the sensors are physically located, and then pass those decisions to the head DES node 201. The way in which multiple sensors are aggregated, and the fusion algorithm, may be executed at least in part at the local DES node, which typically has more processing power than each individual sensor.

Figure 12:
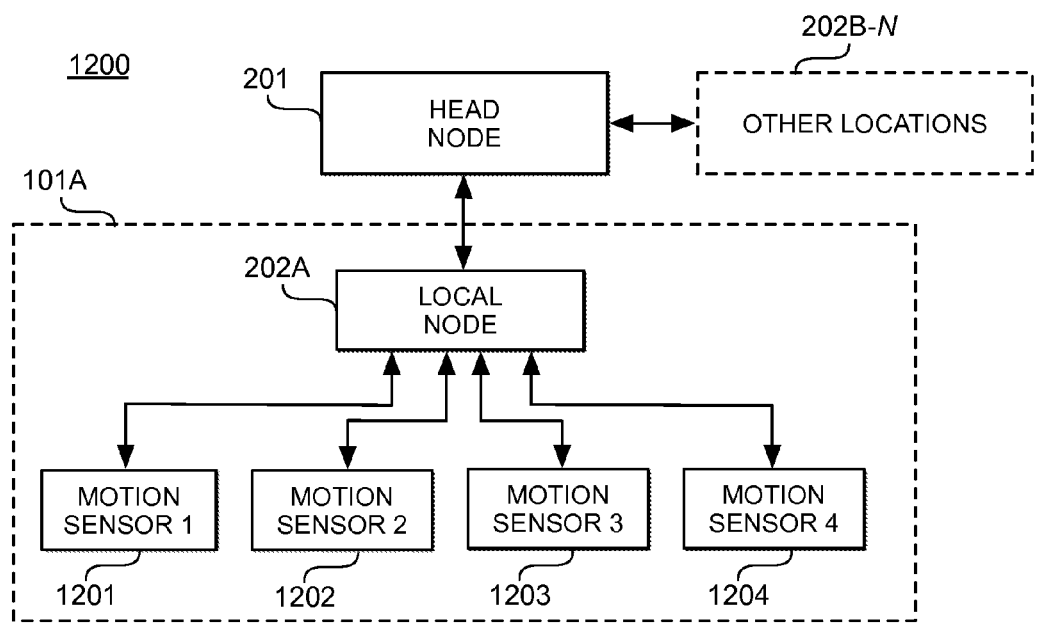
FIGS. 12 and 13 are a block diagrams illustrating examples of sensor fusion applications, according to some embodiments.

FIG. 12 shows example 1200 of a sensor fusion application according to some embodiments. In this case, four motion sensors 1201-1204 are placed at location 101A. Location 101A also includes local DES node 202A, which is configured to aggregate the information received from sensors 1201-1204. Specifically, local DES node 202A may be programmed with a fusion algorithm to aggregate the information from each of sensors 1201-1204 and to make a determination about the environment at location 101A. For instance, such a fusion algorithm may attempt to determine a direction of a person's movement in the environment based upon the order in which sensors 1201-1204 are triggered.

Figure 13:
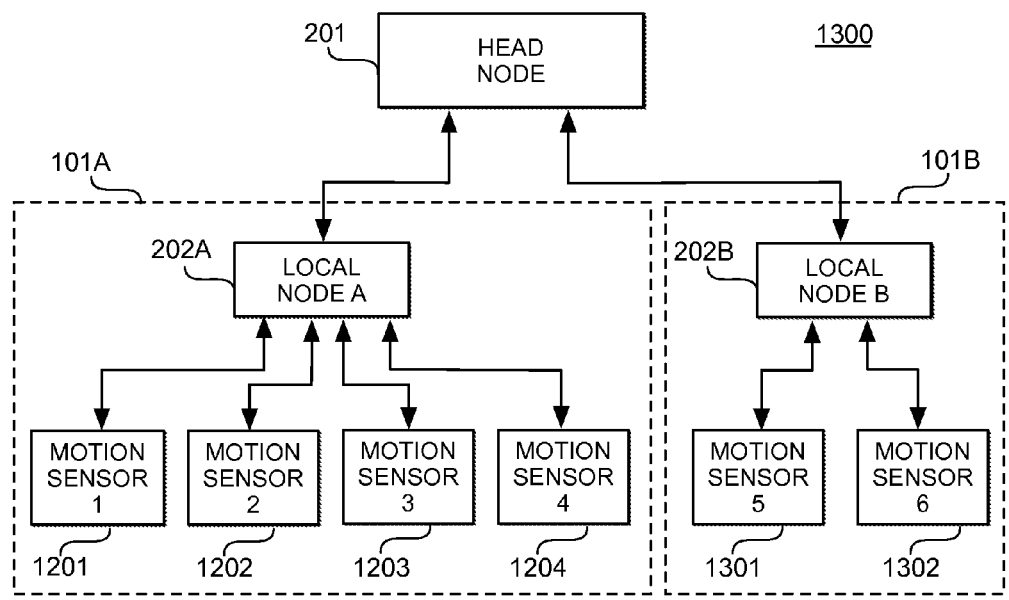

FIG. 13 shows example 1300 of the same sensor fusion application as in FIG. 12, but where more sensors 1301 and 1302 are required and these additional sensors need to be placed at location 101B far enough away from location 101A to justify the use of local DES 202B, such that the final decision making may be moved to a higher-level DES node, in this case head DES node 201. In this situation, each of locations 101A and 101B may make a decision about the state of "movement" of their respective environments, while an overall determination on "movement" in the system is accomplished at head DES node 201. Alternatively, if communication between local DES nodes 202A and 202B is possible, then the system may decide to use local DES node 202A as the ultimate decision-making entity, since more sensors are located in closer proximity to local DES node 202A (as opposed to local DES node 202B).

It should be noted that the different applications discussed previously, such as those involving the use of triggering and selectors, may make the process of writing software code for sensor fusion algorithms much easier. Again, the software code would be written independent of the fact that execution would actually happen at location 101A.

G. Embedded Systems

In some applications, sensors and other controllable devices (e.g., devices 203-1 through 203-4 in FIG. 2) may themselves employ a microcontroller or the like. Generally speaking, a microcontroller lacks components found in full-featured processors, and therefore may not be able to act as a DES node with the capability of executing both a discovery mode and an execution mode, as previously described. In some implementations, however, the systems and methods described herein may allow the device's behavior to change dynamically during the execution of a program.

For example, in some cases, discovery mode on a local DES node may determine that a component responsible for running a small portion of a software program is a microcontroller-based device, or other execution system with restricted capabilities. Accordingly, the local DES node may compile the software code into a machine-ready format, and it may send this executable code to the microcontroller-based device prior to the DES entering execution mode. This technique may allow a microcontroller-based device or other restricted execution system to still be programmed via a single program being run by the DES system. Some amount of decision-making may take place on the DES system, and, consequently, a microcontroller-based device may be allowed to dynamically change its behavior.

To illustrate this application, consider the software code below that causes behavior of each of a plurality of "photo-sensors" to be triggered when the ambient light value is less than 30 and when the last triggering event occurred more than 100 ms ago.

```
devJS.selectAll("photosensor").setBehavior(function( ) {
    device.light.trigger( function( ) {
        if(    device.light.value    <    30    &&
device.light.lastms > 100 )
            return true;
        else return false;
        });
    });
})
.on(device.light) {
    devJS.location("A").selectAll("light").setOn(true); }
```

In this example, during discovery mode, the inner portion of code:

```
function ( ) {
    if ( device.light.value < 30 && device.light.lastms > 100 )
    return true;
    else return false;
});
``` may be determined by a local DES node to be executable by a microcontroller-based photosensor. Hence, still during the discovery mode, the local DES node may compile this section and send it as ready to execute instructions to that microcontroller-based, "photosensor" device.

In execution mode, the local DES node may ignore the "setBehavior" call. Yet, the second portion of code:

```
.on(device.light) {
    devJS.location("A").selectAll("light").setOn(true); }
``` may be executed by the local DES node as previously described. In other words, a DES node may, during discovery mode, determine that certain portions of code belonging to certain devices that are not able to handle both a symbolic discovery and execution mode be sent precompiled and/or in executable form so that the devices may perform their portion of the work, which may occur before the main execution takes place.

Although the invention(s) is/are described herein with reference to specific embodiments, various modifications and changes can be made without departing from the scope of the present invention(s), as set forth in the claims below. For example, although presented in the context of automation devices, various systems and methods described herein may be implemented in other types of electronic devices. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method, comprising:
   electronically storing program instructions configured to invoke interactions with one or more of a plurality of automation devices, the plurality of automation devices divided into sets of one or more automation devices, each set of one or more automation devices associated with a respective Distributed Execution System (DES) node; and
   electronically distributing the program instructions to each DES node, each DES node configured to operate in a discovery mode to evaluate the program instructions and identify one or more semantic statements that are applicable to its associated set of one or more automation devices, each DES node configured to operate in an execution mode subsequently to the discovery mode to execute the identified one or more semantic statements with respect to that DES node's associated set of one or more automation devices.

2. The method of claim 1, wherein the program instructions include a semantic statement applicable to a selected one of a plurality of different categories of automation devices, wherein a given DES node is configured to identify a subset of one or more automation devices among its associated set of one or more automation devices that fit the selected category, and wherein the given DES is configured to execute the semantic statement with respect to the subset of one or more automation devices.

3. The method of claim 1, wherein the program instructions include a semantic statement applicable to a selected one of a plurality of different locations, wherein a first DES node is configured to execute the semantic statement in response to the first DES node's location matching the selected location, and wherein a second DES node is configured to ignore the semantic statement in response to the second DES node's location not matching the selected location.

4. The method of claim 1, wherein a given DES node is configured to successfully execute its identified one or more semantic statements after an automation device has been removed from the given DES node's associated set of one or more automation devices without change in the program instructions.

5. The method of claim 1, wherein a given DES node is configured to successfully execute its identified one or more semantic statements after a new automation device has been added to the given DES node's associated set of one or more automation devices without change in the program instructions.

6. The method of claim 1, wherein the distinct DES nodes are organized in a hierarchy, and wherein a given DES node is configured to communicate a result of execution of its identified one or more semantic statements to another, same-level DES node, in response to an interruption in communication between the given DES node and a higher-level DES node.

7. A local Distributed Execution System (DES) node, comprising:
   memory configured to store instructions; and
   processing circuitry coupled to the memory, the processing circuitry configured to execute the instructions to cause the local DES node to:
   receive semantic code from a head DES node, the semantic code including one or more statements pertaining to one or more devices remotely located with respect to the head DES node;
   evaluate the semantic code, as part of a discovery operation, to identify a set of the one or more statements that are pertinent to a set of the one or more devices associated with the local DES node; and
   execute, as part of an execution operation, the identified set of one or more statements with respect to the set of the one or more devices.

8. The local DES node of claim 7, wherein to evaluate the semantic code, the processing circuitry is further configured to execute the instructions to cause the local DES node to identify the set of the one or more statements independently from identification of a second set of the one or more statements by a second local DES node remotely located with respect to the local DES node, the second set of the one or more statements pertaining to a second set of the one or more devices associated with the second local DES node.

9. The local DES node of claim 8, wherein the semantic code is such that execution of the identified set of the one or more statements is conditional upon execution of the second set of the one or more statements, the processing circuitry further configured to determine, as part of the discovery operation, to wait for an indication from the head DES node that the second set of the one or more statements has been executed by the second local DES node prior to the local DES node executing the identified set of the one or more statements.

10. The local DES node of claim 7, the processing circuitry further configured to execute the instructions to cause the local DES node to successfully execute the identified set of the one or more statements in the absence of a change in the semantic code and after a determination that: (i) a given device has been removed from the set of the one or more devices, or (ii) a new device has been added to the set of the one or more devices.

11. The local DES node of claim 7, the processing circuitry further configured to execute the instructions to cause the local DES node to determine that a given device within the set of the one or more devices has software execution capabilities, to compile at least a portion of the identified set of the one or more statements, and to distribute the compiled portion to the given device.

12. A non-transitory computer-readable storage medium having program instructions stored thereon that, upon execution by a processor within a central computing node, cause the central computing node to:
   store semantic code, the semantic code including one or more statements invoking interactions with one or more devices remotely located with respect to the computing node;
   transmit the semantic code to a first local computing node, wherein the first local computing node is configured to evaluate the semantic code to identify a first set of the one or more statements that is applicable to a first set of the one or more devices associated with the first local computing node, and to execute the first set of the one or more statements; and transmit the semantic code to a second local computing node, wherein the second local computing node is configured to evaluate the semantic code to identify a second set of the one or more statements that is applicable to a second set of the one or more devices associated with the second local computing node, and to execute the second set of the one or more statements.

13. The non-transitory computer-readable storage medium of claim 12, wherein the identification of the first set of the one or more statements by the first local computing node is independent of the identification of the second set of one or more statements by the second local computing node.

14. The non-transitory computer-readable storage medium of claim 12, wherein execution of the second set of the one or more statements is independent from execution of the first set of one or more statements, and wherein the second local computing node is configured to execute the second set of the one or more statements without knowledge of whether the first set of one or more statements has been executed by the first local computing node.

15. The non-transitory computer-readable storage medium of claim 12, wherein execution of at least one portion of the second set of the one or more statements is conditional upon execution of the first set of the one or more statements, and wherein the second local DES is configured to make an autonomous determination to wait for an indication from the central computing node that the first set of the one or more statements has been executed by the first local computing node prior to the second local computing node executing the at least one portion of the second set of the one or more statements.

16. The non-transitory computer-readable storage medium of claim 15, wherein execution of at least one other portion of the second set of the one or more statements is independent from execution of the first set of the one or more statements, and wherein the second local computing node is configured to execute the at least one other portion of the second set of the one or more statements prior to receiving the indication from the central computing node that the first set of the one or more statements has been executed by the first local computing node.

17. The non-transitory computer-readable storage medium of claim 12, wherein the first local computing node is configured to execute the first set of the one or more statements after an increase in a number of devices in the first set of one or more devices and in the absence of a corresponding change in the semantic code.

18. The non-transitory computer-readable storage medium of claim 12, wherein the first local computing node is configured to execute the first set of the one or more statements after a decrease in a number of devices in the first set of one or more devices and in the absence of a corresponding change in the semantic code.

19. The non-transitory computer-readable storage medium of claim 12, wherein the first and second sets of the one or more devices are automation controllers or sensors.

20. The non-transitory computer-readable storage medium of claim 19, wherein the semantic code includes a sensor fusion algorithm.

* * * * *